(12) United States Patent
Carraro (10) Patent No.: US 11,850,972 B2
(45) Date of Patent: Dec. 26, 2023

(54) SYSTEMS AND METHODS FOR OCCUPANT CLASSIFICATION

(71) Applicants: Bruno D. Carraro, Ferndale, MI (US); MAGNA SEATING INC., Aurora (CA)

(72) Inventor: Bruno D Carraro, Ferndale, MI (US)

(73) Assignee: Magna Seating Inc., Aurora (CA)

( * ) Notice: Subject to any disclaimer, the term of this patent is extended or adjusted under 35 U.S.C. 154(b) by 381 days.

(21) Appl. No.: 17/261,210

(22) PCT Filed: Jul. 17, 2019

(86) PCT No.: PCT/US2019/042167
§ 371 (c)(1),
(2) Date: Jan. 19, 2021

(87) PCT Pub. No.: WO2020/018645
PCT Pub. Date: Jan. 23, 2020

(65) Prior Publication Data
US 2021/0276457 A1  Sep. 9, 2021

Related U.S. Application Data

(60) Provisional application No. 62/700,613, filed on Jul. 19, 2018.

(51) Int. Cl.
| | |
|---|---|
| *G01G 19/414* | (2006.01) |
| *G01G 19/44* | (2006.01) |
| *B60N 2/00* | (2006.01) |
| *B60R 21/015* | (2006.01) |
| *B60N 2/64* | (2006.01) |

(Continued)

(52) U.S. Cl.
CPC ............... *B60N 2/002* (2013.01); *B60N 2/64* (2013.01); *B60R 21/01516* (2014.10); *G01G 19/4142* (2013.01); *G01G 19/44* (2013.01); *G01G 19/52* (2013.01); *G06N 3/08* (2013.01)

(58) Field of Classification Search
CPC .... G01G 19/4142; G01G 19/44; G01G 19/52; B60N 2/002; B60N 2/64; G06N 3/08; B60R 21/015; B60R 21/01516
See application file for complete search history.

(56) References Cited

U.S. PATENT DOCUMENTS

| | | | |
|---|---|---|---|
| 6,345,839 B1 * | 2/2002 | Kuboki | ............ B60R 21/01516 73/862.632 |
| 6,392,550 B1 | 5/2002 | Najor | |

(Continued)

FOREIGN PATENT DOCUMENTS

EP  3369610  5/2018

*Primary Examiner* — Randy W Gibson
(74) *Attorney, Agent, or Firm* — Miller Canfield (57) ABSTRACT

An occupant classification system for a seat assembly (20) includes a plurality of sensors (32), a posture classifier and a weight classification system. The seat assembly includes a seat cushion (22) and a seat back (24). Each of the plurality of sensors (32) measures a force applied to the seat cushion (22) by an occupant of the seat assembly. The posture classifier identifies a posture of the occupant based on the distribution of forces applied to each of the plurality of sensors (32). The weight classification system identifies a weight class of the occupant based on the posture and the magnitude of forces applied to each of the plurality of sensors (32).

14 Claims, 6 Drawing Sheets

(51) Int. Cl.
   *G01G 19/52*   (2006.01)
   *G06N 3/08*    (2023.01)

(56) References Cited

U.S. PATENT DOCUMENTS

| | | | |
|---|---|---|---|
| 7,475,903 B2 | 1/2009 | Watts | |
| 8,417,422 B2 | 4/2013 | Choi et al. | |
| 10,670,448 B2 * | 6/2020 | Aina | G01G 19/4142 |
| 2005/0149461 A1 | 7/2005 | Kennedy et al. | |
| 2010/0138078 A1 | 6/2010 | Choi et al. | |
| 2016/0368398 A1 | 12/2016 | Fujii et al. | |
| 2020/0370945 A1 * | 11/2020 | Aina | B60N 2/002 |
| 2022/0163371 A1 * | 5/2022 | Aina | B60N 2/002 |
| 2022/0219571 A1 * | 7/2022 | Yang | G07C 5/0808 |

* cited by examiner

FIG. 6

SYSTEMS AND METHODS FOR OCCUPANT CLASSIFICATION

CROSS-REFERENCE TO RELATED APPLICATIONS

This application claims priority to U.S. provisional patent application No. 62/700,613, filed Jul. 19, 2018, which is incorporated herein by reference.

TECHNICAL FIELD

The present invention relates to an occupant classification system for a seat assembly in an automotive vehicle.

BACKGROUND OF THE INVENTION

Automotive vehicles include one or more seat assemblies having a seat cushion and a seat back for supporting a passenger or occupant above a vehicle floor. The seat assembly is commonly mounted to the vehicle floor by a riser assembly. The seat back is typically operatively coupled to the seat cushion by a recliner assembly for providing selective pivotal adjustment of the seat back relative to the seat cushion.

Front passenger seat assemblies for automotive vehicles typically include an occupant classification system for determining the weight of an occupant in the seat assembly. Occupant classification systems are useful to optimize vehicle safety systems, such as airbag deployment systems. For example, an occupant classification system may send the weight of an occupant to an occupant restraint controller, which may alter the intensity at which an airbag deploys depending on the weight of the occupant. For smaller individuals, the airbag may deploy at a lower intensity or not deploy at all.

Occupant classification systems typically include a pressure sensing device, such as a plurality of sensing cells or a bladder system, located in the seat cushion, which determines the weight of an occupant by measuring the amount of force applied to the seat cushion. However, the amount of force applied to the seat cushion varies depending on the occupant's posture because the occupant's posture affects the weight distribution between the vehicle floor, the seat cushion and the seat back. In addition, each occupant has a distinct manner of sitting that may affect their weight distribution on the seat.

Figure 1A:
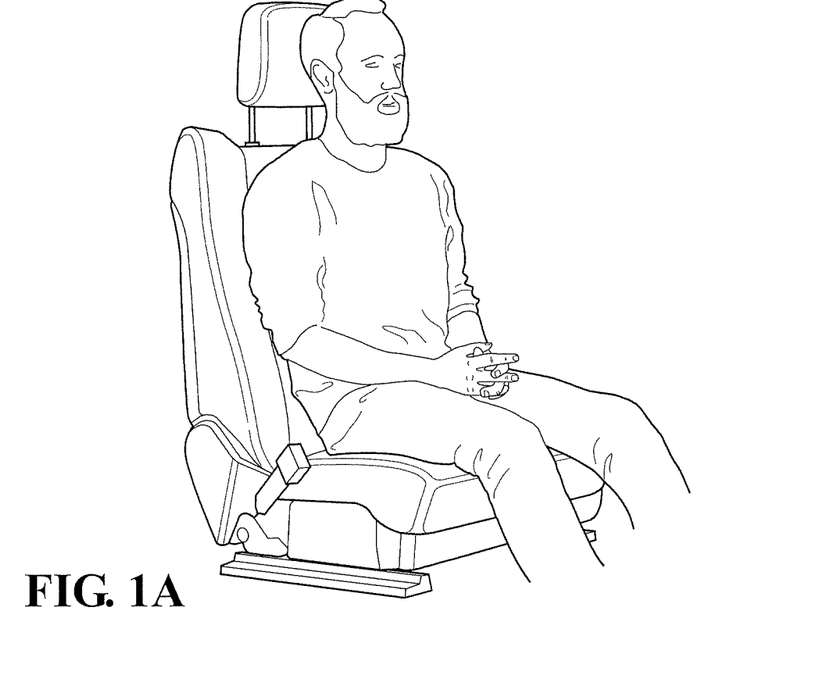
FIG. 1A is a perspective view of a person sitting on a seat assembly in one posture.
Figure 1B:
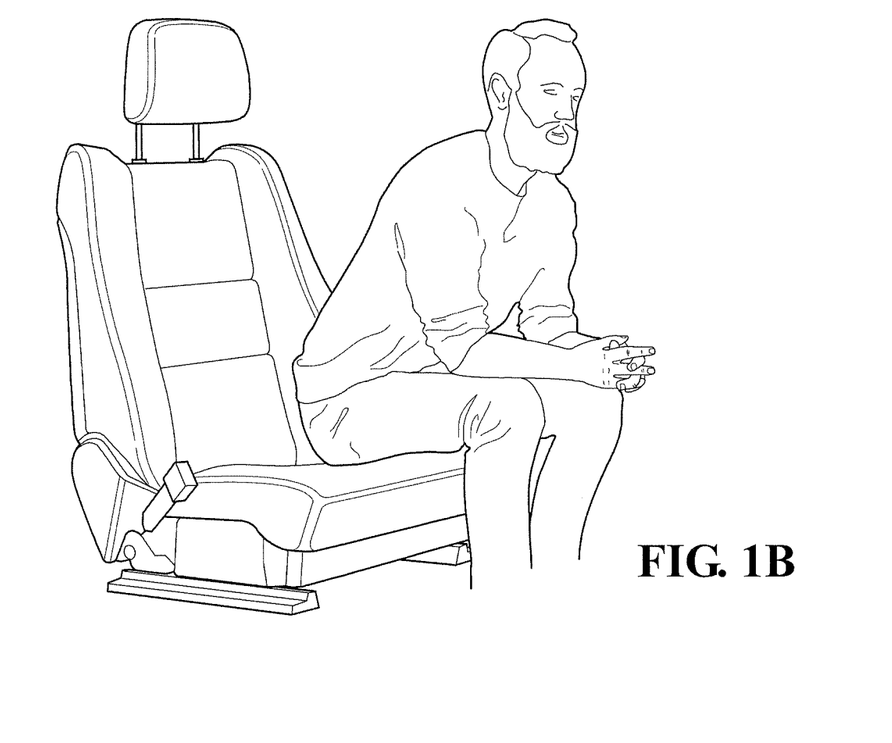
FIG. 1B is a perspective view of the person in FIG. 1A sitting on the seat assembly in a second posture.
Figure 2A:
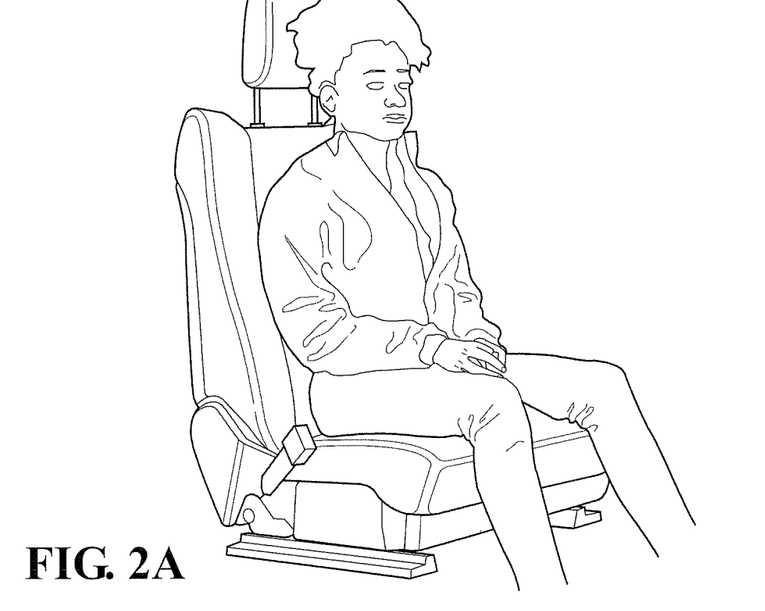
FIG. 2A is a perspective view of another person sitting on a seat assembly in one posture.
Figure 2B:
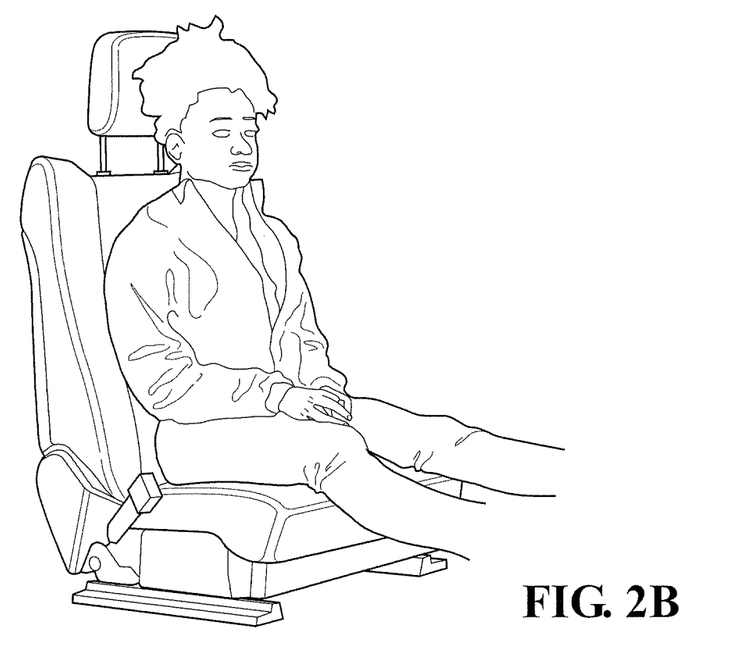
FIG. 2B is a perspective view of the person in FIG. 2A sitting on the seat assembly in a second posture.

For example, the amount of force measured on a seat cushion for a person sitting upright with their feet on the floor and their lower legs extended as depicted in FIG. 1A may be 49.8 kg. If that same individual leans forward as depicted in FIG. 1B, the amount of force decreases to 29.7 kg. Similarly, the amount of force measured on a seat cushion for a person sitting upright with their feet on the floor and their lower legs extended as depicted in FIG. 2A may be 36.9 kg, but when the individual raises his/her legs as depicted in FIG. 2B, the amount of force increases to 40.5 kg.

Conventional occupant classification systems often misclassify the weight of seat occupants because they do not distinguish between different sitting postures, which can greatly affect the accuracy of the weight measurements. It is desirable, therefore, to provide an occupant classification system that factors an occupant's posture into the weight analysis.

SUMMARY OF THE INVENTION

The present invention significantly improves accuracy in assigning weight classes to occupants in a vehicle seat assembly. According to one embodiment, there is provided an occupant classification system for a seat assembly. The seat assembly includes a seat cushion and a seat back. The occupant classification system comprises a plurality of sensors, a posture classifier and a weight classification system. Each of the plurality of sensors measures a force applied to the seat cushion by an occupant of the seat assembly. The posture classifier identifies a posture of the occupant based on the distribution of forces applied to each of the plurality of sensors. The weight classification system identifies a weight class of the occupant based on the posture and the magnitude of forces applied to each of the plurality of sensors.

According to another embodiment, there is provided a method associated with classifying an occupant of a seat assembly. The seat assembly includes a seat cushion and a seat back. The method comprises the steps of measuring a plurality of forces applied by the occupant to the seat cushion, using the plurality of forces to identify a posture of the occupant, and using the posture and the plurality of forces to identify a weight class of the occupant.

According to another embodiment, there is provided a method for deriving an occupant classification system for a seat assembly. The seat assembly includes a seat cushion and a seat back. The method comprises the steps of using a probabilistic method to train a posture classifier to differentiate between a plurality of postures, for each of the plurality of postures, using a deterministic method to derive a weight classification system for identifying one of a plurality of weight classes, and when the weight classification system is unable to identify the one of the plurality of weight classes, using a second probabilistic method to train the weight classification system to identify the one of the plurality of weight classes.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 3:
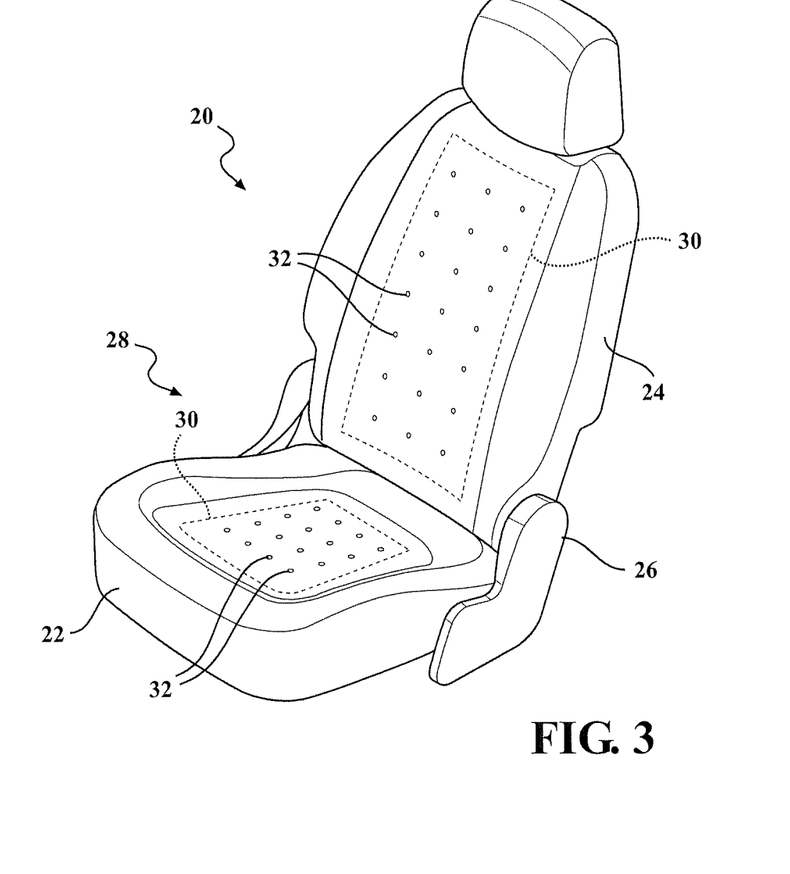
FIG. 3 is a perspective view of a seat assembly for an automotive vehicle.

FIG. 3 illustrates one embodiment of a seat assembly 20 for use in an automotive vehicle. The seat assembly 20 includes a seat cushion 22 and a seat back 24 operatively coupled to the seat cushion 22 for supporting a seat occupant in a generally upright seating position. The seat back 24 is typically operatively coupled to the seat cushion 22 by a recliner assembly 26 for providing pivotal movement between an upright seating position and a plurality of reclined seating positions.

The seat assembly 20 includes an occupant classification system 28 for determining the posture 34 and the weight class 36 of an occupant in the seat assembly 20. Rather than trying to identify the precise weight of an occupant, the occupant classification system 28 of the present invention identifies the likelihood that the occupant belongs to a certain weight class. For example, the system 28 may distinguish between four standard adult weight classes: feather weight, light weight, middle weight and heavy weight. Feather weight is defined as an adult that falls below the $5^{th}$ percentile. Light weight is defined as an adult between the $5^{th}$ and $50^{th}$ percentile. Middle weight is defined as an adult between the $50^{th}$ and $95^{th}$ percentile. Heavy weight is defined as an adult above the $95^{th}$ percentile.

Conventional occupant classification systems commonly mistake child seats for adults because the weight measured on a seat cushion includes not only the weight of the child seat and the weight of a child in the child seat, but also may be affected by seat belt tension. The present invention solves this problem by treating a child seat as a posture 34. Once categorized as a posture 34, the system 28 may distinguish between different child seat weight classes 36. For example, the system 28 may distinguish between a 12-month old, a 3-year old and a 6-year old.

Figure 4:
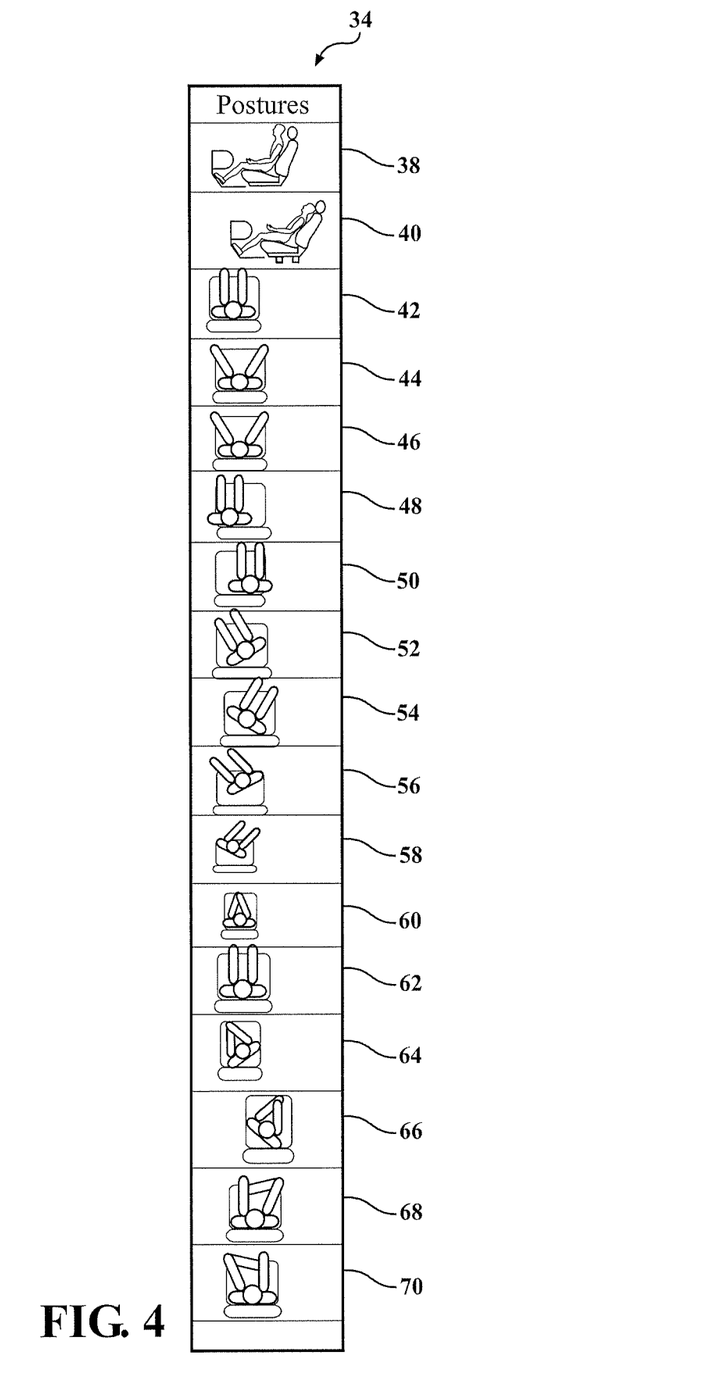
FIG. 4 is a chart identifying potential postures.

In addition to a child seat, the system 28 may distinguish between any number of postures 34. For example, referring to FIG. 4, the system 28 may distinguish between a person sitting upright with their feet on the floor and their lower legs extended 38, a person sitting in a slouched position 40, a person sitting upright with their feet on the floor and their lower legs pulled in toward the seat 42, a person sitting with their legs spread apart with their feet on the floor and their lower legs pulled in toward the seat 44, a person sitting with their legs spread apart with their feet on the floor and their lower legs extended 46, a person sitting on the left side of the seat with their lower legs pulled in toward the seat 48, a person sitting on the right side of the seat with their lower legs pulled in toward the seat 50, a person sitting with their legs angled to the left 52, a person sitting with their legs angled to the right 54, a person sitting on the front edge of the seat with their legs angled to the left 56, a person sitting on the front edge of the seat with their legs angled to the right 58, a person sitting with their legs crossed 60, a person sitting with their hands beneath their thighs 62, a person sitting with their legs crossed and angled to the left 64, a person sitting with their legs crossed and angled to the right 66, a person sitting with their right foot tucked under their left thigh 68, and a person sitting with their left foot tucked under their right thigh 70.

The occupant classification system 28 may be used to optimize vehicle safety systems, such as an airbag deployment system. For example, the occupant classification system 28 may provide the posture 34 of the occupant to an occupant restraint controller so that the occupant restraint controller will not deploy an airbag under certain conditions, such as if there is a child seat in the seat assembly 20 or if the occupant is sitting in a vulnerable position that is not ideal for airbag deployment. The occupant classification system 28 also may provide the weight class 36 of the occupant to the occupant restraint controller so that the occupant restraint controller may alter the intensity at which the airbag deploys. For example, for feather weight individuals, the occupant restraint controller may deploy the airbag at a lower intensity.

Referring to FIG. 3, the occupant classification system 28 of the present invention includes an array 30 of sensing cells 32 in the seat cushion 22. Each sensing cell 32 measures the amount of force applied to the cell 32. In a preferred embodiment, the system 28 also includes an array 30 of sensing cells 32 in the seat back 24. Including the sensing cells 32 in both the seat cushion 22 and the seat back 24 increases overall performance of the system 28. Although the seat cushion 22 is depicted as including 4 rows of 4 sensing cells, and the seat back 24 is depicted as including 7 rows of 3 sensing cells, the number of sensing cells 32 in each array 30 is customizable.

Each sensing cell 32 provides a voltage based on the magnitude of force applied to each individual sensing cell 32. Using a 10,000-ohm bias resistor and a 10-bit analog-to-digital converter, the dynamic range of reliable force measured on each cell 32 may vary between 0 and 10 kg. The system 28 may output an array 30 of values 400 times per second.

Figure 5:
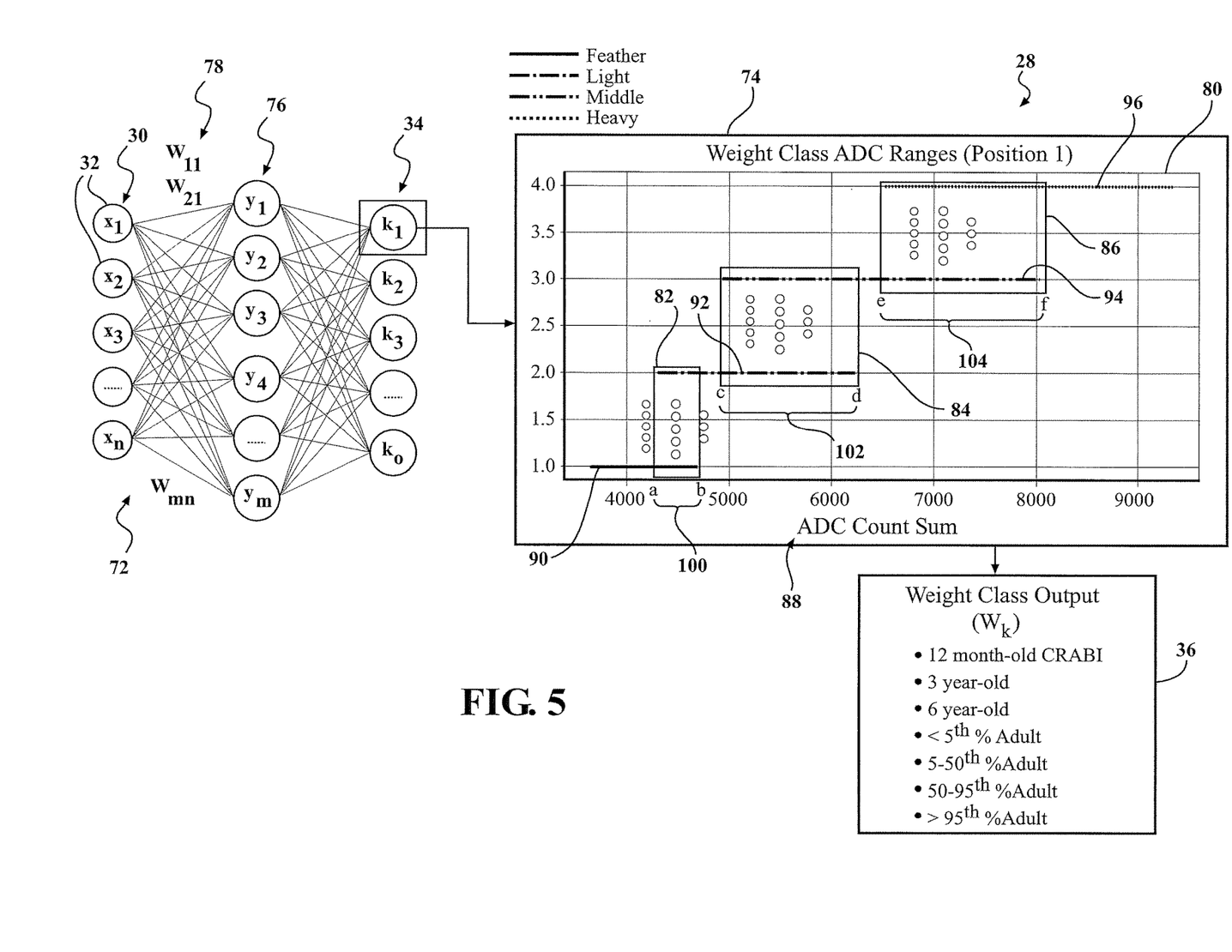
FIG. 5 depicts an occupant classification system in accordance with the present invention.

Referring to FIG. 5, the occupant classification system 28 of the present invention also includes a posture classifier 72 and a plurality of weight classifier systems 74. Each posture 34 corresponds to a unique weight classifier system 74. The posture classifier 72 determines the posture 34 of the occupant in the seat assembly 20 based on the distribution of forces on the array 30 of sensing cells 32. After determining the occupant's posture 34, the corresponding weight classifier system 74 determines the weight class 36 of the occupant based on the magnitude of force on each sensing cell 32 in the array 30.

The posture classifier 72 may comprise a deterministic model or a probabilistic model. Preferably, the posture classifier 72 comprises a probabilistic model. A probabilistic model is preferred over a deterministic model because it allows for more significant handling of output ambiguities, it is quicker to develop, it is more easily adapted and scaled, and it more easily accommodates complex user types and behaviors. In addition, because it uses a multiple signal input array, it accommodates complex user types and behaviors. In other words, it uses a higher dimensional analysis (i.e., spatial 3D sensing) compared to a one-dimensional deterministic model.

Preferably, the probabilistic model comprises a neural network. However, other probabilistic models may be used, including support vector machines, logistic regression, decision trees, Naïve-Bayes or nearest neighbors. The posture classifier 72 depicted in FIG. 5 comprises a neural network. Various algorithms may be used to train the neural network to differentiate between the different postures 34. For example, a supervised batch learning method may be used to adjust the weights and bias parameters that feed every node of the neural network and regulates its output. Although probabilistic in nature, once the weights and bias terms have been optimized during the learning process, the system becomes deterministic. In other words, it becomes predicable once it receives a different set of data.

The input layer of the posture classifier 72 comprises the array 30 of sensing cells 32 ($X=[x_1, x_2, \ldots x_n]$), where n represents the number of sensing cells 32. The output layer of the posture classifier 72 comprises the different postures 34 $[k_1, k_2, \ldots k_o]$ that the system has been trained to recognize. The posture classifier 72 includes a hidden layer with m transfer functions 76 $[y_1, y_2, \ldots y_m]$, where the weights 78 of the transfer functions 76 are represented by $[w_{11}, w_{21}, \ldots w_{mn}]$. Although depicted with a single hidden layer, the type and structure of the neural network may be modified to optimize the system, for example by using more than one hidden layer or by changing the number of nodes in the hidden layer.

The weight classifier system 74 may comprise a deterministic model or a probabilistic model. Preferably, the weight classifier system 74 includes a deterministic component 80 and a plurality of probabilistic components 82, 84, 86. For example, the deterministic component 80 may comprise a weight band based on the total sum 88 of the values from the sensing cells 32 for each weight class 36. As depicted in the example in FIG. 5, for a given posture, the feather weight band 90 extends from below 4000 to b, the light weight band 92 extends from a to d, the middle weight band 94 extend from c to f, and the heavy weight band 96 extends from e to over 9000.

There may be an overlap between adjacent weight bands. For the example depicted in FIG. 5, the overlap 100 between the feather weight band 90 and the light weight band 92 occurs when the total sum 88 of the values from the sensing cells 32 falls between a and b. The overlap 102 between the light weight band 92 and the middle weight band 94 occurs when the total sum 88 of the values from the sensing cells 32 falls between c and d. The overlap 104 between the middle weight band 94 and the heavy weight band 96 occurs when the total sum 88 of the values from the sensing cells 32 falls between e and f.

Threshold values may be identified for each weight class in which the total sum 88 of the values from the sensing cells 32 could only reflect one weight class and no other because between or beyond these threshold values, there is no overlap with an adjacent class. For example, if the total sum 88 of the values from the sensing cells 32 is less than a, then the occupant is a feather weight. If the total sum 88 of the values from the sensing cells 32 falls between b and c, then the occupant is a light weight. If the total sum 88 of the values from the sensing cells 32 falls between d and e, then the occupant is a middle weight. And if the total sum 88 of the values from the sensing cells 32 is greater than f, then the occupant is a heavy weight.

Figure 6:
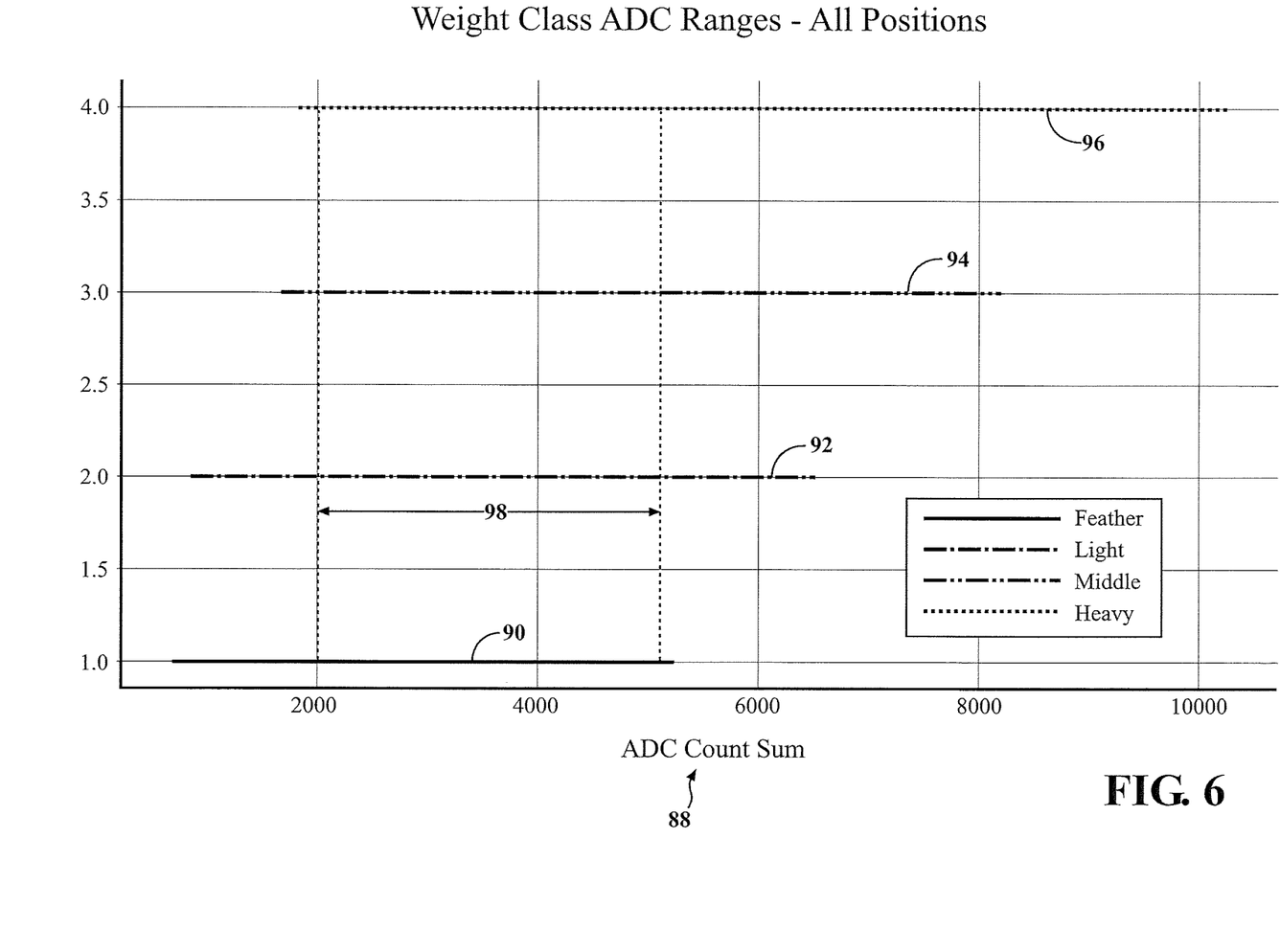
FIG. 6 is a graph illustrating the weight class ranges for four different weight classes for all postures collectively.

FIG. 6 illustrates the importance of factoring posture into determining weight classification. If one were to compare the total sum 88 of the values from the sensing cells 32 for all postures collectively, the weight bands 90, 92, 94, 96 for each weight class will expand because for any given individual, the sensor readings in the different postures may vary significantly. The greater variation in individual sensor readings results in a wider weight band for all individuals within that weight band, and a greater likelihood of overlap between different weight bands. Thus, as depicted, there is an area of overlap 98, not only between adjacent weight classes, but between all four weight classes. By contrast, viewing the sensor readings on a posture-by-posture basis, as illustrated by the deterministic component 80 in FIG. 5, fine-tunes the weight class bands 90, 92, 94, 96 in such a way that overlap is reduced and limited to adjacent classes.

Returning to FIG. 5, if the total sum 88 of the values from the sensing cells 32 falls within overlap 100, then probabilistic component 82 may be used to distinguish between the feather and light weight classes. If the total sum 88 of the values from the sensing cells 32 falls within overlap 102, then probabilistic component 84 may be used to distinguish between the light and middle weight classes. If the total sum 88 of the values from the sensing cells 32 falls within overlap 104, then probabilistic component 86 may be used to distinguish between the middle and heavy weight classes.

Preferably, each probabilistic component 82, 84, 86 of the weight classifier system 74 comprises a neural network. However, other probabilistic models may be used, including support vector machines, logistic regression, decision trees, Naïve-Bayes, nearest neighbors, regression-based models or a radial basis network. Similar to the posture classifier 72, the probabilistic components 82, 84, 86 are trained to differentiate between their respective adjacent weight classes.

Additional modifications may be made to improve the accuracy of the occupant classification system 28. For example, the system 28 may determine the centroid of the occupant and use it to enhance one or more of the probabilistic models 72, 82, 84, 86. The centroid also may be useful to identify transitions in postures 34 and to identify slight variations based on the occupant's specific manner of sitting.

The deterministic component 80 of the weight classifier system 74 may use metrics different from the total sum 88 of the values from the sensing cells 32 to identify the weight classes. For example, the deterministic component 80 may be based on the centroid of the occupant or the average of the values measured from the sensing cells 32. Likewise, these metrics may be used to enhance one or more of the probabilistic models 72, 82, 84, 86. The system 28 also may use the temperature of the sensors 32 to enhance one or more of the probabilistic models 72, 82, 84, 86.

There may be circumstances in which one or more of the probabilistic models 72, 82, 84, 86 may not be able to clearly identify a single posture 34 or weight class 36 into which an occupant falls. In these circumstances, the system 28 can apply a deterministic model to help distinguish which posture 34 or weight class 36 is most appropriate for this occupant.

The system 28 also may assign a greater degree of significance to some of the sensing cells 32 over the others. For example, the system 28 may double the value for the sensing cells 32 located near the occupant's center of gravity or decrease the value for the sensing cells 32 located closer to the bolsters before they are input into the classification systems 72, 74.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. An occupant classification system for a seat assembly wherein the seat assembly includes a seat cushion and a seat back, the system comprising:
   a plurality of sensors wherein each of the plurality of sensors measures a force applied to the seat cushion by an occupant of the seat assembly;
   a posture classifier for identifying a posture of the occupant based on the distribution of forces applied to each of the plurality of sensors, wherein the posture classifier comprises a probabilistic model; and
   a weight classification system for identifying a weight class of the occupant based on the posture and the magnitude of forces applied to each of the plurality of sensors, wherein the weight classification system comprises a deterministic component with a deterministic method to identify the weight class and a probabilistic component with a probabilistic method to identify the weight class in case the deterministic method is unable to identify a single weight class.

2. The occupant classification system of claim 1 wherein the posture classifier comprises a neural network, a support vector machine, a logistic regression, a decision tree, a Naïve-Bayes or nearest neighbors.

3. The occupant classification system of claim 1 wherein the deterministic component identifies the weight class based on the sum of the forces applied to each of the plurality of sensors.

4. The occupant classification system of claim 1 wherein the probabilistic component comprises a neural network, a support vector machine, a logistic regression, a decision tree, a Naïve-Bayes, nearest neighbors, regression-based models or a radial basis network.

5. The occupant classification system of claim 1 further comprising a second plurality of sensors wherein each of the second plurality of sensors measures a force applied to the seat back, wherein:
the posture classifier identifies the posture of the occupant based on the distribution of forces applied to each of the plurality of sensors and the distribution of forces applied to each of the second plurality of sensors; and
the weight classification system identifies the weight class of the occupant based on the posture, the magnitude of forces applied to each of the plurality of sensors and the magnitude of forces applied to each of the second plurality of sensors.

6. A method associated with classifying an occupant of a seat assembly, wherein the seat assembly includes a seat cushion and a seat back, the method comprising the steps of:
measuring a plurality of forces applied by the occupant to the seat cushion;
using the plurality of forces to identify a posture of the occupant, wherein a probabilistic method is used to identify the posture; and
using the posture and the plurality of forces to identify a weight class of the occupant wherein a deterministic method is used to identify the weight class and a second probabilistic method is used to identify the weight class if the deterministic method does not identify a single weight class.

7. The method of claim 6 wherein the probabilistic method comprises a neural network, a support vector machine, a logistic regression, a decision tree, a Naïve-Bayes or nearest neighbors.

8. The method of claim 6 wherein the deterministic method identifies the weight class based on a sum of the forces applied to each of the plurality of sensors.

9. The method of claim 6 wherein the second probabilistic method comprises a neural network, a support vector machine, a logistic regression, a decision tree, a Naïve-Bayes, nearest neighbors, regression-based models or a radial basis network.

10. The method of claim 6 further comprising the steps of:
measuring a second plurality of forces applied by the occupant to the seat back;
using the plurality of forces and the second plurality of forces to identify the posture of the occupant; and
using the posture, the plurality of forces and the second plurality of forces to identify the weight class of the occupant.

11. A method for deriving an occupant classification system for a seat assembly, wherein the seat assembly includes a seat cushion and a seat back, the method comprising the steps of:
using a probabilistic method to train a posture classifier to differentiate between a plurality of postures;
for each of the plurality of postures, using a deterministic method to derive a weight classification system for identifying one of a plurality of weight classes; and
when the weight classification system is unable to identify the one of the plurality of weight classes, using a second probabilistic method to train the weight classification system to identify the one of the plurality of weight classes.

12. The method of claim 11 wherein the probabilistic method comprises a neural network, a support vector machine, a logistic regression, a decision tree, a Naïve-Bayes, nearest neighbors, regression-based models or a radial basis network.

13. The method of claim 11 wherein the second probabilistic method comprises a neural network, a support vector machine, a logistic regression, a decision tree, a Naïve-Bayes, nearest neighbors, regression-based models or a radial basis network.

14. The method of claim 11, wherein the deterministic method identifies a weight class based on a sum of the forces applied to each of the plurality of sensors.

* * * * *